(12) United States Patent
Farkas et al.

(10) Patent No.: US 9,992,689 B2
(45) Date of Patent: Jun. 5, 2018

(54) METHODS AND SYSTEMS FOR PROCESSING COMMUNICATIONS BETWEEN A BASE STATION AND MOBILE DEVICE BASED ON WIRELESS COMMUNCIATIONS OF ANOTHER BASE STATION

(71) Applicant: COLLISION COMMUNICATIONS, INC., Peterborough, NH (US)

(72) Inventors: Joseph Farkas, Merrimack, NH (US); Brandon Hombs, Merrimack, NH (US); Barry West, Peterborough, NH (US); Sayak Bose, Milford, NH (US)

(73) Assignee: COLLISION COMMUNICATIONS, INC, Peterborough, NH (US)

( * ) Notice: Subject to any disclaimer, the term of this patent is extended or adjusted under 35 U.S.C. 154(b) by 850 days.

(21) Appl. No.: 13/920,494

(22) Filed: Jun. 18, 2013

(65) Prior Publication Data
US 2014/0369269 A1    Dec. 18, 2014

(51) Int. Cl.
*H04W 24/02* (2009.01)

(52) U.S. Cl.
CPC .................................. *H04W 24/02* (2013.01)

(58) Field of Classification Search
None
See application file for complete search history.

(56) References Cited

U.S. PATENT DOCUMENTS

| 2008/0247375 A1* | 10/2008 | Muharemovic et al. ..... 370/344 |
| 2013/0260807 A1* | 10/2013 | Suresh .......................... 455/501 |

\* cited by examiner

*Primary Examiner* — Faruk Hamza
*Assistant Examiner* — Alan Lindenbaum

(57) ABSTRACT

Methods and systems for processing communications based on wireless communications of adjacent base stations are disclosed. According to an aspect, a method includes monitoring, by a separate interference monitoring receiver communicatively coupled to a first base station, wireless communications transmitted by a second base station to communicate with one or more mobile devices. The method also includes determining, based on the monitored wireless communications, a wireless communication scheme for processing communications between the first base station and one or more other mobile devices. Further, the method includes processing communications between the first base station and the one or more other mobile devices based on the wireless communication scheme.

26 Claims, 4 Drawing Sheets

METHODS AND SYSTEMS FOR PROCESSING COMMUNICATIONS BETWEEN A BASE STATION AND MOBILE DEVICE BASED ON WIRELESS COMMUNCIATIONS OF ANOTHER BASE STATION

BACKGROUND

Wireless communication networks are utilized to provide various communication services such as voice, video, packet data, messaging, and broadcast. These wireless networks may be multiple-access networks capable of supporting multiple users by sharing the available network resources. A wireless communication network may include a number of base stations that can support communication for a number of user equipment (UE) or mobile computing devices. Mobile computing devices may communicate with a base station via a downlink and uplink. The downlink refers to the communication link from the base station to the mobile computing device, and the uplink refers to the communication link from the mobile computing device to the base station.

A base station may transmit data and control information on the downlink to a mobile computing device and/or may receive data and control information on the uplink from the mobile computing device. On the downlink, a transmission from the base station may encounter interference due to transmissions from neighbor or adjacent base stations or from other wireless radio frequency (RF) transmitters. On the uplink, a transmission from the mobile computing device may encounter interference from uplink transmissions of other mobile computing devices communicating with the neighbor base station or from other wireless RF transmitters. This interference may degrade performance on both the downlink and uplink. For at least this reason, it is desired to provide improved techniques for managing interference from adjacent base stations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods and systems for processing communications based on wireless communications of adjacent base stations. According to an aspect, a method includes monitoring, by a separate interference monitoring receiver communicatively coupled to a first base station, wireless communications transmitted by a second base station to communicate with one or more mobile devices. The method also includes determining, based on the monitored wireless communications, a wireless communication scheme for processing communications between the first base station and one or more other mobile devices. Further, the method includes processing communications between the first base station and the one or more other mobile devices based on the wireless communication scheme.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The techniques described herein may be applied to any suitable wireless communications networks such as, but not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Figure 1:
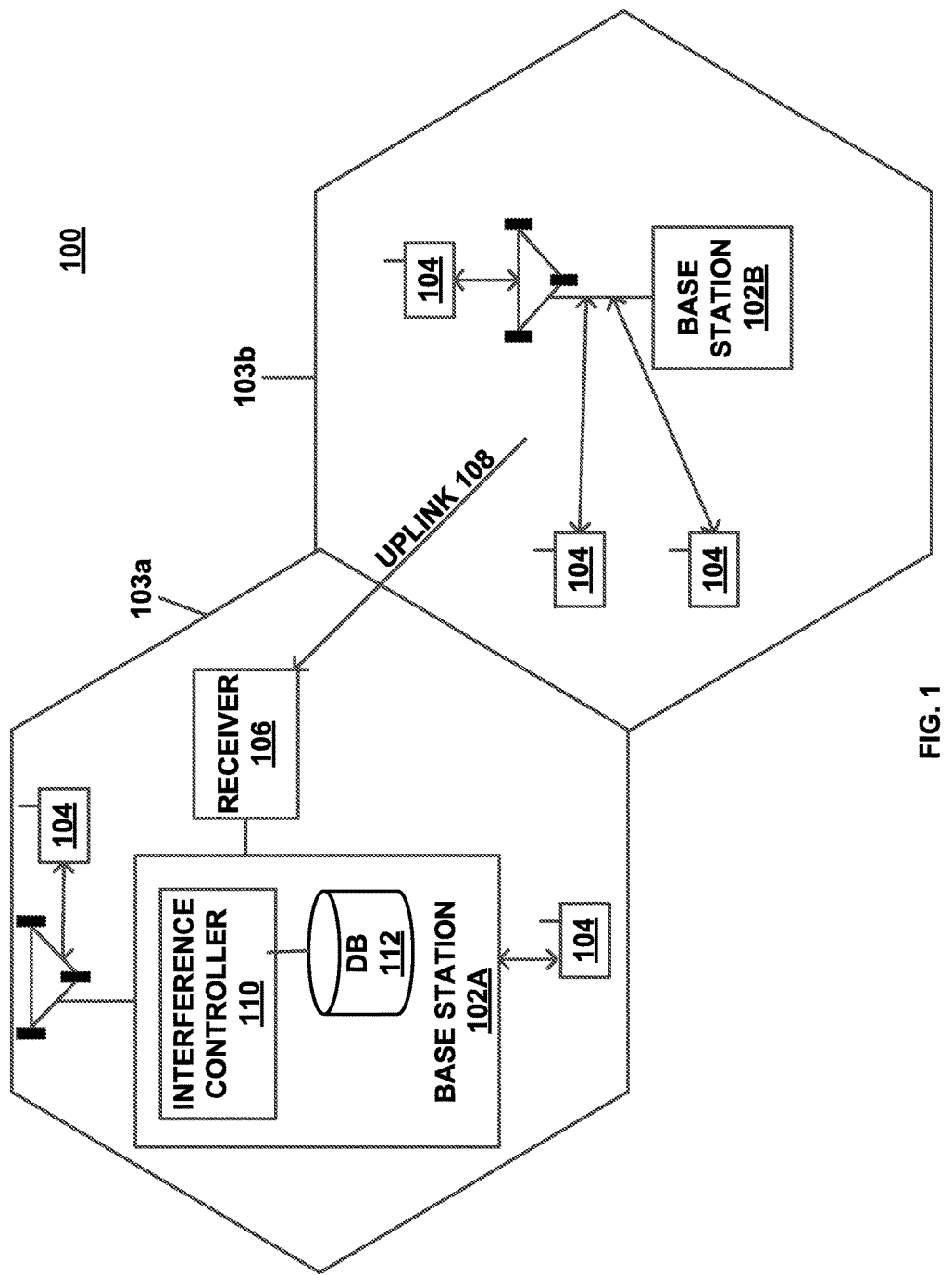
FIG. 1 is a diagram of a wireless communication network configured for managing base station interference in accordance with embodiments of the present subject matter.

FIG. 1 illustrates a diagram of a wireless communication network, generally designated 100, configured for managing base station interference in accordance with embodiments of the present subject matter. The network 100 may be an LTE-A network or any other suitable network. Referring to FIG. 1, the network 100 may include multiple base stations 102a and 102b configured to communicate with mobile devices 104. A base station may also be referred to as an enodeB, an access point, and the like. Each base station 102a and 102b may provide communication coverage for a particular geographic area. Base station 102a may cover cell 103a, and base station 102b may cover cell 103b. The term "cell" can refer to this particular geographic coverage area of a base station and/or base station subsystem serving the coverage area. The network 100 may support Frequency Division Duplex (FDD) or Time Division Duplex (TDD) modes of operation. A network controller (not shown) may be communicatively connected to base stations 102a and 102b and provide coordination and control for the base stations 102a and 102b. The base stations 102a and 102b may communicate with one another, e.g., directly or indirectly via a wireless backhaul or wireline backhaul. For simplicity of illustration, only base stations 102a and 102b are shown, although the network 100 may include one or more other base stations, as well as other mobile devices and network equipment.

The mobile devices 104 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

Base station 102a may include an interference monitoring receiver 106 configured for communication with one or more base stations in accordance with embodiments of the present subject matter. The receiver 106 may be communicatively coupled to base station 102b for receipt of wireless communications transmitted by base station 102b to communicate with one or more mobile devices 104. For example, base station 102b may receive an uplink communication 108. The received uplink communication 108 may be an interfering communication within the cell 103a. The base station 102a may include an interference controller 110 configured to monitor such wireless communications, to develop a scheme for processing communications between the mobile devices and base station 102a, and to process communication based on the known wireless communication scheme as determined from the uplink communication 108. The interference controller 110 may be implemented with hardware, software, firmware, or combinations thereof.

For example, one or more mobile devices 104 are instructed via uplink communication 108 to communicate with certain parameters at certain times. Therefore this information is sufficient to gain full knowledge of what the uplink interference will be in the future. Knowing this information at a neighboring base station 102a may help in either avoid of coexisting with the interfering uplink signals.

Figure 2:
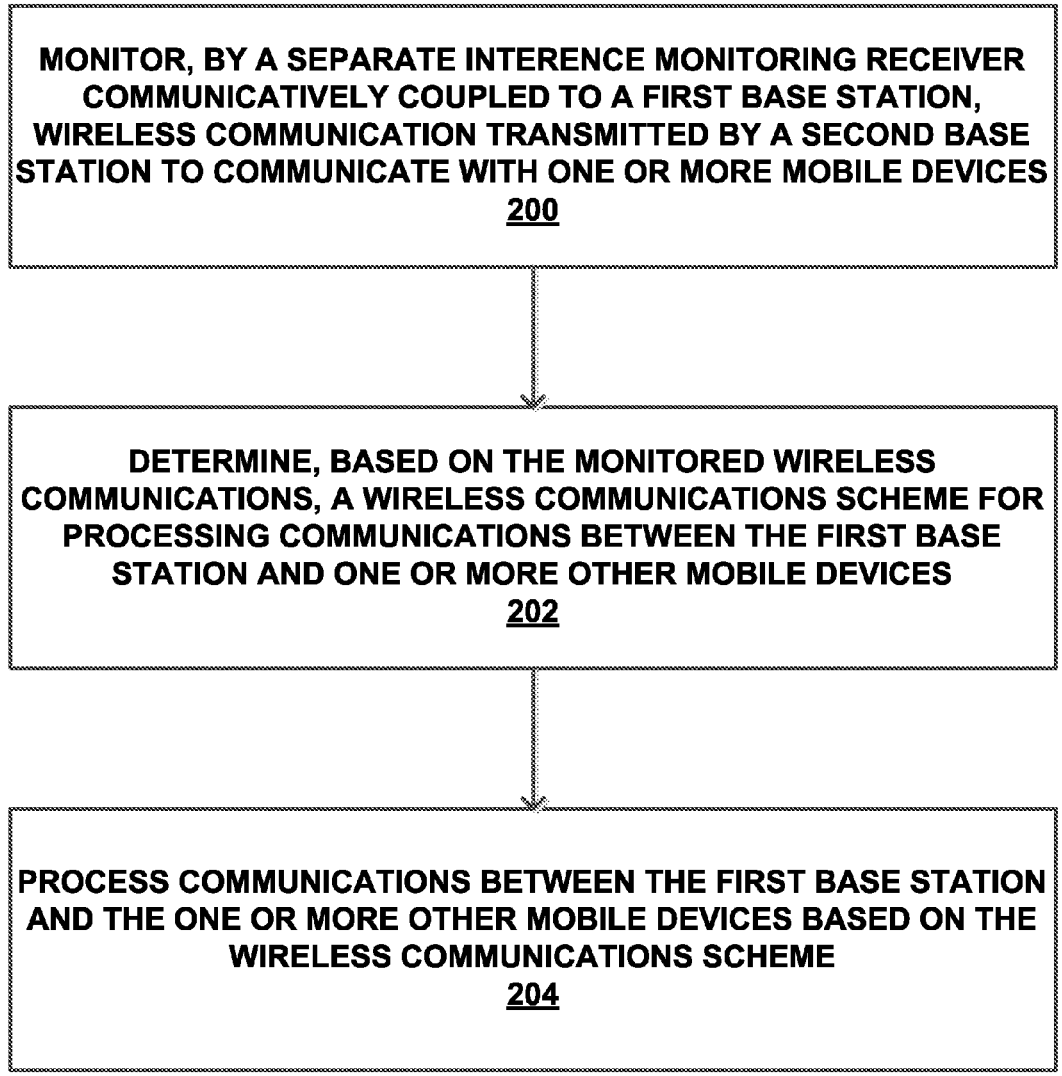
FIG. 2 is a flow chart of an example method for managing interference from adjacent base stations in accordance with embodiments of the present subject matter.

FIG. 2 illustrates a flow chart of an example method for managing interference from adjacent base stations in accordance with embodiments of the present subject matter. This example method is described as being implemented by the controller 110 shown in FIG. 1, although the method may be implemented by any suitable component(s) or equipment. For example, the method may be implemented at equipment apart from a base station.

Referring to FIG. 2, the method includes monitoring, by a separate interference monitoring receiver communicatively coupled to a first base station, wireless communications transmitted by a second base station to communicate with one or more mobile devices (step 200). For example, the interference controller 110 may control the receiver 106 to monitor wireless communications transmitted by the adjacent (or neighboring) base station 102b. These monitored communications may be generated by the base station 102b and intended for one or more of the mobile devices 104 within cell 103b. The controller 110 may receive the wireless communication data obtained by the receiver 106 and store the data in a database 112 of the base station 102a. The controller 110 may receive and store wireless communication data originating from nearby base stations other than 102b, such as other adjacent base stations.

In an example, the receiver 106 may include an antenna configured to scan for communications of the adjacent base station 102b. The antenna may scan horizontally and/or vertically to locate the strongest signals from the base station 102b. Such scanning may be achieved mechanically and/or electrically, or by suitable signal processing.

In an example, the controller 110 and receiver 104 may communicate via a wireless relay. In another example, a relay unit may be positioned apart from the base station and configured to receive communications from an adjacent base station. In this example, the relay unit may subsequently relay the received communications to the base station for use in generating a wireless communication scheme in accordance with embodiments of the present disclosure.

The method of FIG. 2 includes determining, based on the monitored wireless communications, a wireless communication scheme for processing communications between the first base station and one or more other mobile devices (step 202). For example, the controller 110 may determine a wireless communication scheme for processing communications between the base station 102a and one more mobile devices 104 within the cell 103a. As an example, the controller 110 may model interference based on the monitored wireless communications. In this example, the controller 110 may cancel the modeled interference. The cancellation of the interference may be through the use of signal processing techniques such as Multiple Input Multiple Output (MIMO) or Multi-User Detection (MUD). A successive interference canceller is a common example.

In another example of determining a wireless communication scheme, the controller 110 may schedule communications between the base station 102a and the mobile devices 104 within the cell 103a based on the monitored wireless communications. For example, the base station 102a may change the schedule of the mobile devices in cell 103a to avoid the interference coming from the known interference from the mobile devices in cell 103b.

In another example of determining a wireless communication scheme, the controller 110 may adjust communication processing parameters based on the monitored wireless communications. For example, the base station 102a may change the transmission of the mobile devices parameter in cell 103a such as the power, modulation, coding or precoding matrix to better allow coexistence of mobile device in cell 103a and 103b.

In another example of determining a wireless communication scheme, the controller 110 may determine time, frequency, bandwidth, modulation, coding, spreading code, pilots signals, Node IDs, scheduling information, the like or combinations thereof of the monitored wireless communication signals. The controller 110 may control wireless communications between the base controller 102*a* and the mobile devices 104 based on this data of the monitored wireless communication signals.

In another example of determining a wireless communication scheme, the received, wireless communication signal from the base station 102*b* may include one or more of modulation and coding information. The controller 110 may control wireless communication between the base station 102*a* and the mobile devices within the cell 103*a* based on the modulation and/or coding information.

The method of FIG. 2 includes processing communications between the first base station and the one or more other mobile devices based on the wireless communication scheme (step 204). For example, the controller 110 may use the wireless communications scheme to process communications between the base station 102*a* and one or more of the mobile devices 104 within its cell 103*a*.

In accordance with embodiments of the present disclosure, a base station may communicate communication instructions to one or more mobile devices. The instructions may be based on a determined wireless communications scheme. For example, the controller 110 shown in FIG. 1 may determine a wireless communications scheme based on monitored wireless communications between the base station 102*b* and its mobile devices 104. The controller 110 may subsequently control the communication of instructions to the mobile devices 104 within cell 103*a* in accordance with the wireless communications scheme.

In accordance with embodiments of the present disclosure, a controller, such as the controller 110 shown in FIG. 1, may map parameters of wireless communications received from an adjacent cell, such communications between the base station 102*b* and its mobile devices 104. Further, the controller may decode wireless communication signals of the mobile devices connected to the base station 102*b* based on the mapped parameters.

In accordance with embodiments of the present disclosure, a wireless communications scheme may include instructions at a base station for implementing one or more processes for controlling communications between the base station and its mobile devices. For example, a communications scheme may be implemented by the base station 102*a* and its mobile devices 104. Example processes include, but are not limited to, adjusting scheduling, adjusting power control, modeling interfering users within a parameter estimation, and modeling of interfering users within a receiver.

In accordance with embodiments of the present disclosure, a receiver of a base station may be mechanically and/or electrically directed towards another base station for receipt of wireless communications between the other base station and mobile devices. For example, the receiver 106 shown in FIG. 1 may be mechanically and/or electrically directed towards the base station 102*b* and/or elsewhere within the cell 103*b* for detecting communications between the base station 102*b* and the mobile devices 104 within the cell 103*b*. Further, in an example, the receiver may be suitably shielded and/or positioned for suppressing or minimizing signaling from its base station. For example, the mechanical direction may be shielding which physically may be a piece of metal blocking the signals of its base station so that it does not cause excessive interference. Another example may be to physically find a location, such as within a building or in a location with a big loss due to antenna directionality, so that the signals from its base station is minimized.

Figure 3:
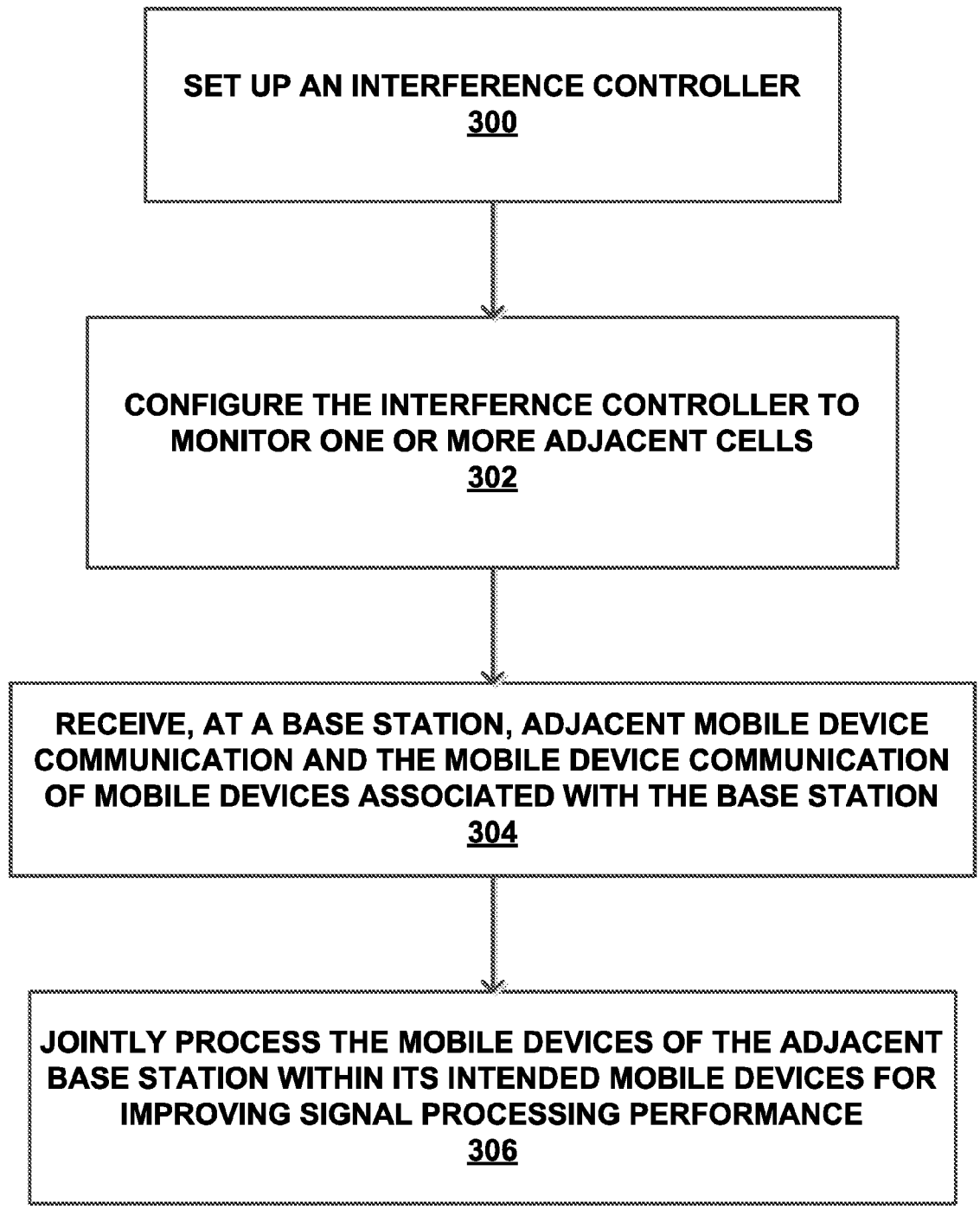
FIG. 3 is a flow chart of an example method for improving uplink throughput and/or reducing error from mobile device transmission in accordance with embodiments of the present subject matter.

In accordance with embodiments of the present subject matter, the bandwidth, modulation and/or coding information of mobile devices in adjacent cells may be used to improve the signal processing capability of a neighboring base station for improving uplink throughput and/or reducing error from the transmission from the mobile devices. FIG. 3 illustrates a flow chart of an example method for improving uplink throughput and/or reducing error from mobile device transmission in accordance with embodiments of the present subject matter. Referring to FIG. 3, the method includes setting up an interference controller such that it reduces the interference from its base station (step 300). For example, providing shielding between the receive antenna and its base station. The method also includes configuring the interference controller to monitor one or more adjacent cells (step 302). For example, the interference controller may be configured such that the modulation, coding, and bandwidth of the mobile devices are known when performing signal processing.

The method of FIG. 3 includes receiving, at the base station, adjacent mobile device communication and the mobile device communication of mobile devices associated with the base station (step 304).

The method of FIG. 3 includes jointly processing the mobile devices of the adjacent base station within its intended mobile devices for improving signal processing performance (step 306). For example, jointly modeling within the parameter estimation and multi-user detection module the interferer and desired intra-cell user.

Figure 4:
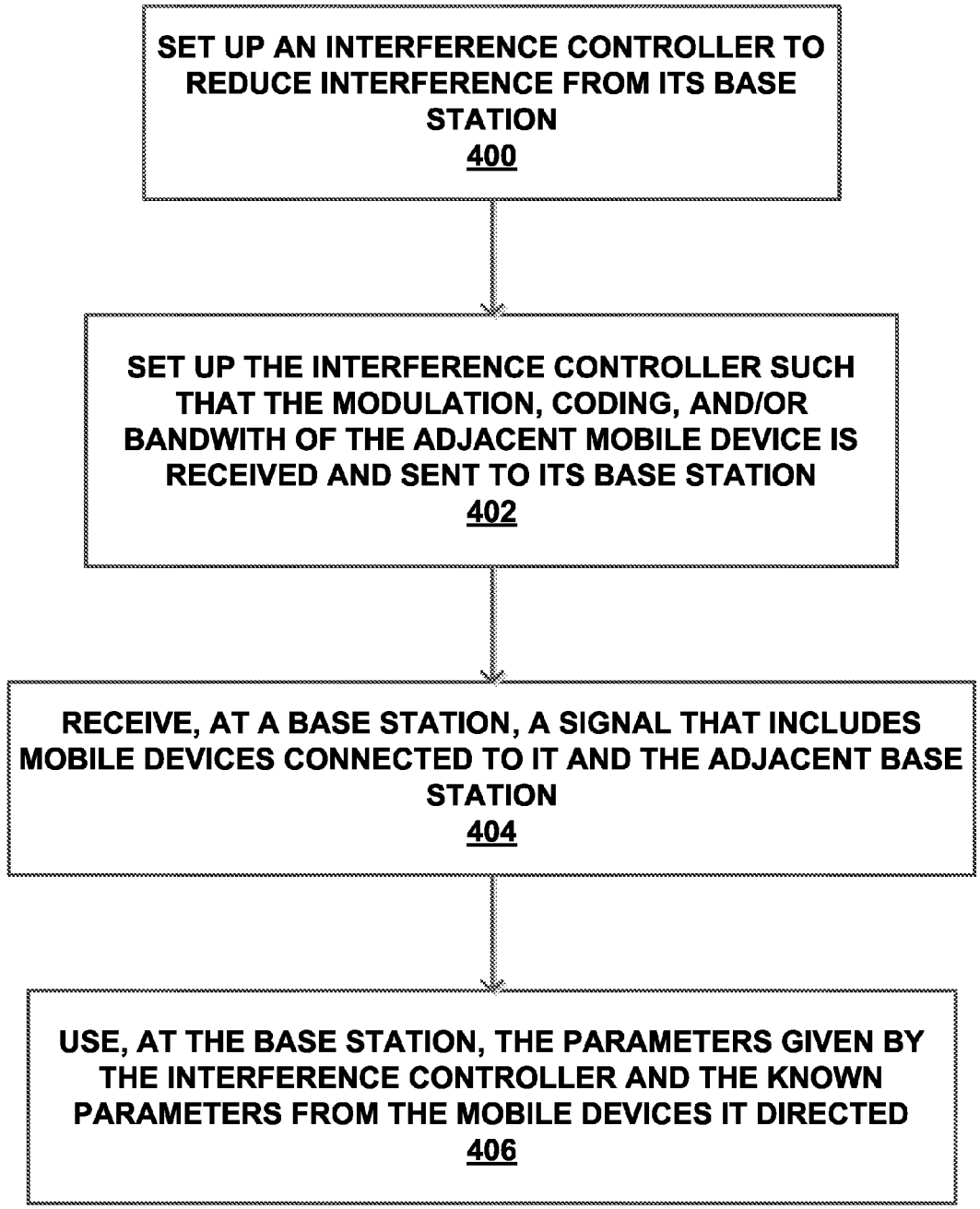
FIG. 4 is a flow chart of an example method for decoding in accordance with embodiments of the present subject matter.

In accordance with embodiments of the present subject matter, an interference controller may intend to capture specific parameters of modulation, coding and/or bandwidth of mobile devices connected to an adjacent base station by listening to the downlink messages from that base station. FIG. 4 illustrates a flow chart of an example method for decoding in accordance with embodiments of the present subject matter. Referring to FIG. 4, the method includes setting up an interference controller to reduce interference from its base station by physically isolating it via shielding and/or electronically steering it towards the adjacent base station (step 400). For example, the electronic steering may include putting one or more nulls towards its base station in order to suppress it. The method includes setting up the interference controller such that the modulation, coding and/or bandwidth of the adjacent mobile device is received and sent to its base station (step 402). The method of FIG. 4 includes receiving, at the base station, a signal that includes mobile devices connected to it and the adjacent base station (step 404). The method includes using, at the base station, the parameters given by the interference controller and the known parameters from the mobile devices it directed in order to decode the signals with higher reliability (step 406).

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/ or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
monitoring, by a separate interference monitoring receiver communicatively coupled to a first base station, wireless communications transmitted by a second base station to communicate with one or more mobile devices;
determining, based on the monitored wireless communications, a wireless communication scheme for processing communications between the first base station and one or more other mobile devices; and
processing communications between the first base station and the one or more other mobile devices based on the wireless communication scheme,
wherein determining a wireless communication scheme comprises adjusting communication processing parameters based on the monitored wireless communications.

2. The method of claim 1, wherein determining a wireless communication scheme comprises modeling interference based on the monitored wireless communications.

3. The method of claim 2 comprising canceling the modeled interference.

4. The method of claim 1, wherein the first and second base stations operate within adjacent cells.

5. The method of claim 1, wherein processing communications comprises modeling and canceling interference from wireless communication signals between the second base station and the one or more mobile devices based on the received, wireless communication signal.

6. The method of claim 1, wherein the received, wireless communications comprises one of time, frequency, bandwidth, modulation, coding, spreading code, pilots signals, Node IDs, and scheduling information.

7. The method of claim 1, wherein the received, wireless communications comprises one of modulation and coding information of the wireless communications, and
wherein processing communications comprises controlling wireless communication based on the one of modulation and coding information of the wireless communication signal.

8. The method of claim 1, wherein processing communications comprises communicating communication instructions to the one or more other mobile devices.

9. The method of claim 1, further comprising communicating wireless communications from the receiver to the first base station via a wireless relay.

10. The method of claim 1, further comprising:
mapping parameters of the received, wireless communications; and
decoding wireless communication signals of the second base station based on the mapped parameters.

11. The method claim 1, further comprising using, at the first base station, the wireless communications to one or more of: adjust scheduling, adjust power control, model interfering users within a parameter estimation, and model interfering users within a receiver.

12. A system comprising:
an interference monitoring receiver communicatively coupled to a first base station, and configured to monitor wireless communications transmitted by a second base station to communicate with one or more mobile devices; and
an interference controller configured to:
determine, based on the monitored wireless communications, a wireless communication scheme for processing communications between the first base station and one or more other mobile devices; and
process communications between the first base station and the one or more other mobile devices based on the wireless communication scheme,
wherein the interference controller is configured to adjust communication processing parameters based on the monitored wireless communications.

13. The system of claim 12, wherein the interference controller is configured to model interference based on the monitored wireless communications.

14. The system of claim 13 wherein the interference controller is configured to cancel the modeled interference.

15. The system of claim 12, wherein the first and second base stations operate within adjacent cells.

16. The system of claim 12, wherein the interference controller is configured to model and cancel interference from wireless communication signals between the second base station and the one or more mobile devices based on the received, wireless communication signal.

17. The system of claim 12, wherein the received, wireless communications comprises one of time, frequency, bandwidth, modulation, coding, spreading code, pilots signals, Node IDs, and scheduling information.

18. The system of claim 12, wherein the received, wireless communications comprises one of modulation and coding information of the wireless communications, and
wherein the interference controller is configured to control wireless communication based on the one of modulation and coding information of the wireless communication signal.

19. The system of claim 12, wherein the interference controller is configured to communicate communication instructions to the one or more other mobile devices.

20. The system of claim 12, wherein the receiver is configured to communicate the wireless communications to the first base station via a wireless relay.

21. The system of claim 12, wherein the interference controller is configured to:
map parameters of the received, wireless communications; and
decode wireless communication signals of the second base station based on the mapped parameters.

22. The system claim 12, wherein the interference controller is configured to use, at the first base station, the wireless communications to one or more of: adjust scheduling, adjust power control, model interfering users within a parameter estimation, and model interfering users within a receiver.

23. A method comprising:
monitoring, by a separate interference monitoring receiver communicatively coupled to a first base station, wireless communications transmitted by a second base station to communicate with one or more mobile devices;
determining, based on the monitored wireless communications, a wireless communication scheme for processing communications between the first base station and one or more other mobile devices; and
processing communications between the first base station and the one or more other mobile devices based on the wireless communication scheme,
wherein determining a wireless communication scheme comprises scheduling communications between the first base station and the one or more other mobile devices based on the monitored wireless communications.

24. A method comprising:
monitoring, by a separate interference monitoring receiver communicatively coupled to a first base station, wireless communications transmitted by a second base station to communicate with one or more mobile devices;
determining, based on the monitored wireless communications, a wireless communication scheme for processing communications between the first base station and one or more other mobile devices; and
processing communications between the first base station and the one or more other mobile devices based on the wireless communication scheme,
wherein the received, wireless communications comprises one of time, frequency, and bandwidth information of the wireless communications, and
wherein processing communications comprises controlling wireless communication based on the one of time, frequency, and bandwidth information.

25. A system comprising:
an interference monitoring receiver communicatively coupled to a first base station, and configured to monitor wireless communications transmitted by a second base station to communicate with one or more mobile devices; and
an interference controller configured to:
determine, based on the monitored wireless communications, a wireless communication scheme for processing communications between the first base station and one or more other mobile devices; and
process communications between the first base station and the one or more other mobile devices based on the wireless communication scheme,
wherein the interference controller is configured to schedule communications between the first base station and the one or more other mobile devices based on the monitored wireless communications.

26. A system comprising:
an interference monitoring receiver communicatively coupled to a first base station, and configured to monitor wireless communications transmitted by a second base station to communicate with one or more mobile devices; and
an interference controller configured to:
determine, based on the monitored wireless communications, a wireless communication scheme for processing communications between the first base station and one or more other mobile devices; and
process communications between the first base station and the one or more other mobile devices based on the wireless communication scheme,
wherein the received, wireless communications comprises one of time, frequency, and bandwidth information of the wireless communications, and
wherein the interference controller is configured to control wireless communication based on the one of time, frequency, and bandwidth information.

* * * * *